United States Patent
Nishikawa et al.

(10) Patent No.: US 7,965,937 B2
(45) Date of Patent: Jun. 21, 2011

(54) ELECTRONIC APPARATUS, IMAGE PICKUP APPARATUS, TIME-CORRECTING METHOD, AND PROGRAM

(75) Inventors: Takuma Nishikawa, Kanagawa (JP); Masanao Tsutsui, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/653,508

(22) Filed: Dec. 15, 2009

(65) Prior Publication Data

US 2010/0166409 A1 Jul. 1, 2010

(30) Foreign Application Priority Data

Dec. 25, 2008 (JP) .............................. P2008-330545

(51) Int. Cl.
*G03B 17/24* (2006.01)
(52) U.S. Cl. ...................................... 396/310
(58) Field of Classification Search .................... 396/310
See application file for complete search history.

(56) References Cited

U.S. PATENT DOCUMENTS

| | | | | |
|---|---|---|---|---|
| 5,309,500 | A * | 5/1994 | Koma et al. ................... | 455/566 |
| 2002/0191492 | A1* | 12/2002 | Kamper et al. ................ | 368/47 |
| 2007/0081813 | A1* | 4/2007 | Hong et al. ................... | 396/310 |
| 2007/0085734 | A1* | 4/2007 | Whitehead et al. ....... | 342/357.02 |
| 2010/0026526 | A1* | 2/2010 | Yokota .......................... | 340/996 |

FOREIGN PATENT DOCUMENTS

| | | |
|---|---|---|
| JP | 9-297191 A | 11/1997 |
| JP | 2008164436 A | 7/2008 |
| JP | 2010060455 A | 3/2010 |

OTHER PUBLICATIONS

Office Action from Japanese Application No. 2008-330545, dated Nov. 30, 2010.

* cited by examiner

*Primary Examiner* — Rodney E Fuller
(74) *Attorney, Agent, or Firm* — Lerner, David, Littenberg, Krumholz & Mentlik, LLP

(57) ABSTRACT

An electronic apparatus includes: a timer part that measures a time, a location information acquiring part that acquires location information, and a peripheral location calculating part where a location specified by the acquired location information is provided as a reference location and a location at a predetermined distance from the reference location is calculated as a peripheral location. The electronic apparatus also includes a time-difference acquiring part that acquires time differences depending on the reference location and the peripheral location. Furthermore, the electronic apparatus includes a determining part that determines whether the time correction should be performed based on the time differences depending on the reference location and the peripheral location, and a time-correcting part that corrects the time to a time based on the time difference between the reference location and the peripheral location depending on a result from the determination by the determining part.

12 Claims, 8 Drawing Sheets

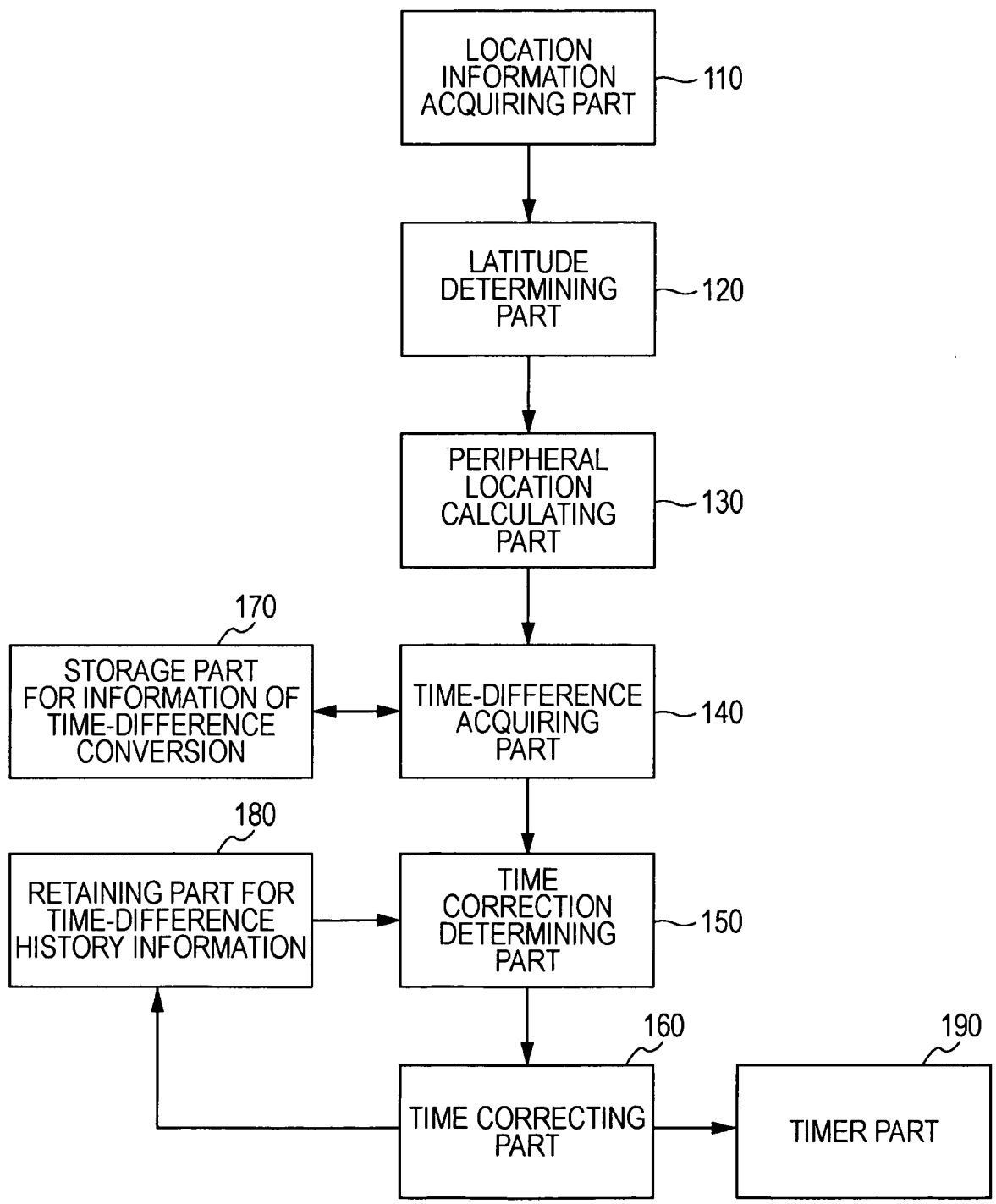

ELECTRONIC APPARATUS, IMAGE PICKUP APPARATUS, TIME-CORRECTING METHOD, AND PROGRAM

CROSS-REFERENCE TO RELATED APPLICATION

The present application claims priority from Japanese Patent Application No. JP 2008-330545 filed in the Japanese Patent Office on Dec. 25, 2008, the entire content of which is incorporated herein by reference.

BACKGROUND OF THE INVENTION

1. Field of the Invention

The present invention relates to an electronic apparatus, and particularly relates to an electronic apparatus, an image pickup apparatus, and a processing method applicable to these apparatuses, and a program for allowing a computer to carry out such a method.

2. Description of the Related Art

Heretofore, an image pickup apparatus such as a digital video camera with a timer function for measuring the time to record a captured video with time and date has been common in the art. It is useful for a user to easily grasp the recording time of the video when reproducing the video recorded in this way.

In recent years, a user has an increasing opportunity to use an image pickup apparatus in his or her country but also use in a foreign country visited on a trip or on business. For instance, when using the image pickup apparatus in a visited foreign country, a time measured by a timer function may be changed to adjust the time and date associated with video data to the local time of the country. When changing the time in this way, for example, the user may manually adjust the time to the local time of the country and such an adjustment may be troublesome.

Therefore, an automatic time corrector that corrects the time to the local time of the country without manually adjusting the time by the user's hand (see, for example, Japanese Unexamined Patent Application Publication No. 9-297191, particularly FIG. 1 thereof). In this automatic time corrector, on the basis of location information transmitted from a GPS (Global positioning System) satellite, a receiving location is determined on a map and a time difference between the time of the receiving location and GMT (Greenwich Mean Time) with reference to the information of time zone in the map. Then, the time difference thus obtained is used for correcting the time of the receiving location such that a time obtained by reducing the time difference to a measured reference time is defined as the time of the receiving location.

SUMMARY OF THE INVENTION

According to the above patent document, for example, when the user is staying in a foreign country, a time correction can be appropriately performed without a user's manual time correction.

However, when receiving electric waves transmitted from the GPS satellite, an error may occur in the electric waves affected by the surrounding environment. In this case, accurate location information is hardly obtained, so that an appropriate time correction may be hardly performed. For example, if the time of the receiving location is on the boundary between time zones, it may be determined that electric waves are received at a location with a time zone which is different from an actual time zone and the time of the location may be adjusted to the incorrect time zone. If the time is corrected in this improper way, for example, the time associated with video data may not correspond to the time that reflects the time zone of the actual user's location. In addition, if the time correction is frequently performed depending on time differences due to error in accuracy, user's movement, or the like in the vicinity of the boundary between time zones. For example, the time associated with video data may be frequently changed. If the video recorded in this way is reproduced, the user may hardly grasp the recording time of the video.

Therefore, an appropriate time correction of the time measured by a timer unit has been demanded to be performed at a suitable timing and the present invention has been made in consideration of such a demand.

A first embodiment of the present invention is an electronic apparatus constructed as described below, a processing method applied to such an electronic apparatus, and a program that allows a computer to execute such a method. Here, the electronic apparatus includes: a timer part that measures a time; a location information acquiring part that acquires location information; and a peripheral location calculating part where a location specified by the acquired location information is provided as a reference location and a location at a predetermined distance from the reference location is calculated as a peripheral location. The electronic apparatus also includes a time-difference acquiring part that acquires time differences depending on the reference location and the peripheral location. The electronic apparatus also includes a determining part that determines whether the time correction should be performed based on the time differences depending on the reference location and the peripheral location. The electronic apparatus further includes a time-correcting part that corrects the time to a time based on the time differences depending on the reference location and the peripheral location depending on a result from the determination by the determining part. Therefore, a location specified by the acquired location information can be provided as a reference location and a location at a predetermined distance from the reference location is calculated as a peripheral location. Thus, a time differences depending on the reference location and the peripheral location can be acquired. Therefore, it is determined whether the time correction should be performed based on the time differences depending on the reference location and the peripheral location. As a result, the time can be corrected to one based on the time difference of the reference location.

In this first embodiment of the present invention, the electronic apparatus may further include a time difference information retaining part that retains the time difference acquired for the reference location when the time correction is performed by the time-correcting part. Thus, the determining part may determine that the time correction is not necessary when a time difference retained in the time difference information retaining part is included in time differences acquired for the reference location and the peripheral location. Therefore, the determining part can determine that the time correction is not necessary when a time difference retained in the time difference information retaining part is included in time differences acquired for the reference location and the peripheral location.

Furthermore, in this first embodiment, the time difference retained in the time difference information retaining part may be rewritten every time the time is corrected by the time-correcting part. Therefore, every time the time difference is updated, the time can be rewritten.

Furthermore, in this first embodiment, the electronic apparatus may further include a storage part for information of time difference conversion where latitude and longitude values and time differences corresponding to the latitude and longitude values are stored in relationship to one another. The time-difference acquiring part may acquire a time difference stored in the storage part for information of time difference conversion in association with the latitude and longitude values included in the acquired location information as a time difference depending on the reference location, and the time difference stored in the storage part for information of time difference conversion in association with the latitude and longitude values corresponding to the peripheral location as a time difference depending on the peripheral location. Therefore, the time-difference acquiring part can acquire a time difference stored in the storage part for information of time difference conversion as a time difference depending on the reference location. In addition, the time-difference acquiring part can acquire the time difference stored in the storage part for information of time difference conversion as a time difference depending on the peripheral location.

In this first embodiment, the electronic apparatus may further include a comparing part making a comparison between the latitude value in the location information and the predetermined value. The determining part may determine that the time correction is not performed when the latitude value in the acquired location information is larger than the predetermined value provided as a reference as a result of comparison performed by the comparing part.

Therefore, if the latitude value in the location information is higher than the predetermined value, then a determination of whether the time correction determining part 150 should be allowed to correct the time is not performed.

Furthermore, in the electronic apparatus of the first embodiment, the determining part may determine whether the time correction should be performed at the time of activating the electronic apparatus. Therefore, the determining part can determine whether the time correction should be performed at the time of activating the electronic apparatus.

Furthermore, the electronic apparatus of the first embodiment may further include a display part displaying a fact that the time correction is performed by the time-correcting part when the time correction is performed by the time-correcting part. Therefore, the user can be notified that the time correction is performed.

Furthermore, in the first embodiment, the peripheral location calculating part may calculate four locations located at the predetermined distance from the reference location in the north, south, east, and west as the peripheral location. Therefore, the peripheral location calculating part may calculate four locations located at the predetermined distance from the reference location in the north, south, east, and west can be calculated as the peripheral location.

In this first embodiment, the peripheral position calculating part may calculate two locations located at the predetermined distance from the reference location in the east and west as the peripheral locations. Therefore, two locations located at the predetermined distance from the reference location in the east and west can be calculated as the peripheral locations.

A second embodiment of the present invention is an electronic apparatus, a processing method thereof, and a program for allowing a computer to execute such a method. The electronic apparatus includes: an image pickup unit shooting a photographic subject to generate a captured video; a timer part that measures a time; a location information acquiring part that acquires location information; and a peripheral location calculating part where a location specified by the acquired location information is provided as a reference location and a location at a predetermined distance from the reference location is calculated as a peripheral location. The electronic apparatus also includes a time-difference acquiring part that acquires time differences depending on the reference location and the peripheral location. The electronic apparatus also includes a determining part that determines whether the time correction should be performed based on the time differences acquired for the reference location and the peripheral location on the condition that the image pickup part does not generate a captured video. The electronic apparatus further includes a time-correcting part that corrects the time to a time based on the time differences depending on the reference location and the peripheral location depending on a result from the determination by the determining part. Therefore, the electronic apparatus can acquire time differences according to the reference location and the peripheral location and determines whether the time correction should be performed based on the time difference depending on the reference location and the peripheral location on the condition that the image pickup part does not generate a captured video. Then, the time can be corrected to a time based on the time differences depending on the reference location and the peripheral location depending on a result from the determination by the determining part.

Therefore, according to any of the embodiments of the present invention, a time correction can be advantageously performed at suitable timing.

BRIEF DESCRIPTION OF THE DRAWINGS

FIG. 2 is a block diagram illustrating an example of the functional configuration of the image pickup apparatus according to a first embodiment of the present invention;

DESCRIPTION OF THE PREFERRED EMBODIMENTS

Hereinafter, the best modes for carrying out the present invention (hereinafter, referred to as embodiments of the present invention) will be described. The embodiments will be described in the following order:

1. First Embodiment (Time-correction control: Embodiment for performing time correction using location information by GPS signal); and
2. Modified Embodiment (Embodiment for acquiring location information by wireless LAN).

1. First Embodiment

Exemplary Internal Configuration of Image Pickup Apparatus

Figure 1:
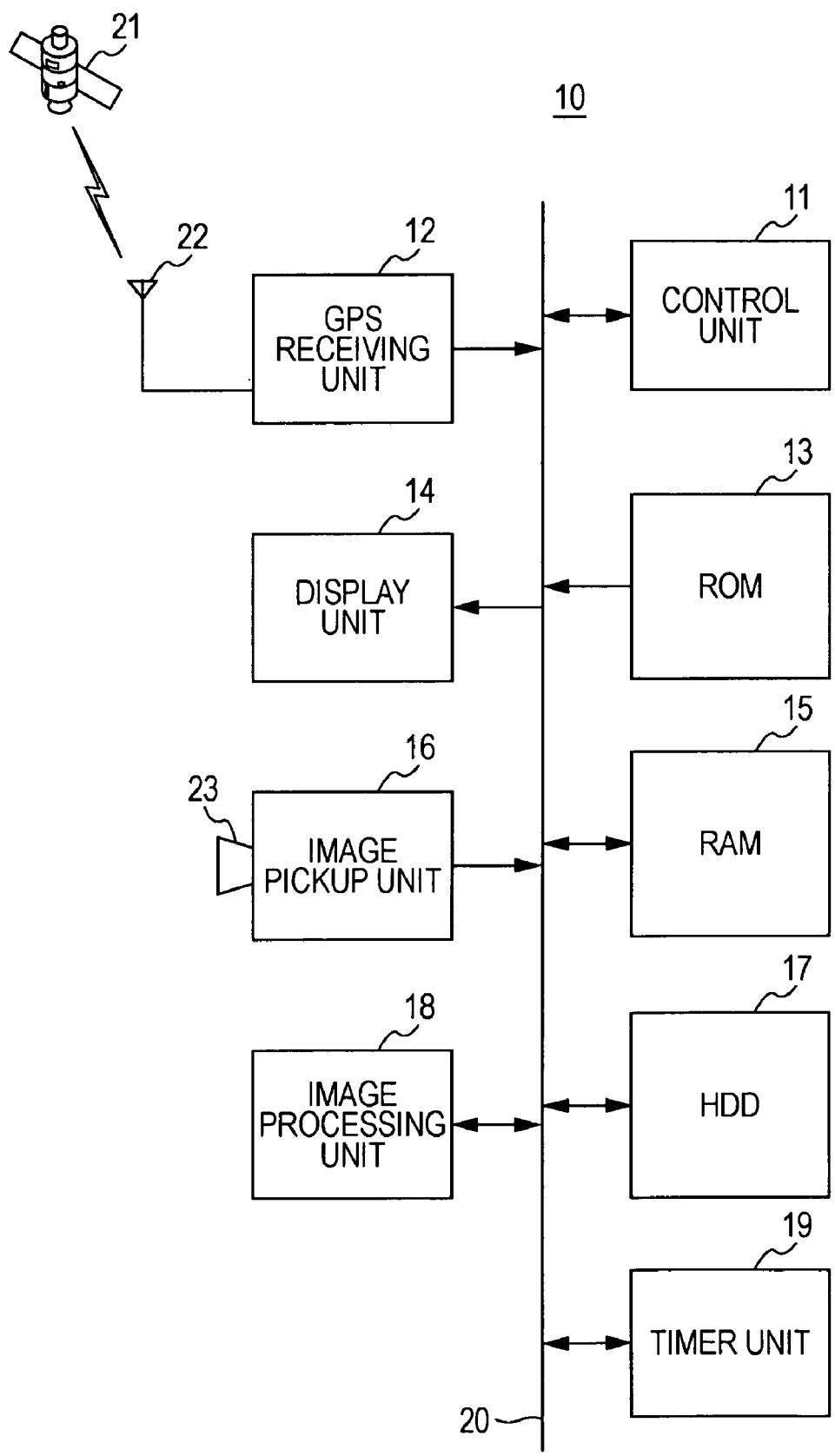
FIG. 1 is a block diagram illustrating an exemplary configuration of an image pickup apparatus according to a first embodiment of the present invention.

FIG. 1 is a block diagram illustrating an exemplary configuration of an image pickup apparatus 10 according to a first embodiment of the present invention. The image pickup apparatus 10 includes a control unit 11, a GPS receiving unit 12, a display unit 14, an image pickup unit 16, an image processing unit 18, a timer unit 19, and a bus 20. In addition, the image pickup apparatus 10 includes a read only memory (ROM) 13, a random access memory (RAM) 15, and a hard disk drive (HDD) 17. Communications among the respective units of the image pickup apparatus 10 are carried out through a bus 20.

The control unit 11 includes a central processing unit (CPU) and so on to control the entire operation of the image pickup apparatus 10.

The GPS receiving unit 12 includes an antenna 22 that receives a GPS signal transmitted from a GPS satellite 21. Based on the GPS signal, the GPS receiving unit 12 calculates the latitude and longitude values of a position receiving the GPS signal. Subsequently, the GPS receiving unit 12 outputs the calculated location information to the control unit 11.

The ROM 13 includes a read-only memory storage that stores programs, parameters, and map data, which may be used for the operation of the control unit 11, and outputs these kinds of information to the control unit 11. Furthermore, the details of map data will be describe in detail using FIG. 3.

Figure 7:
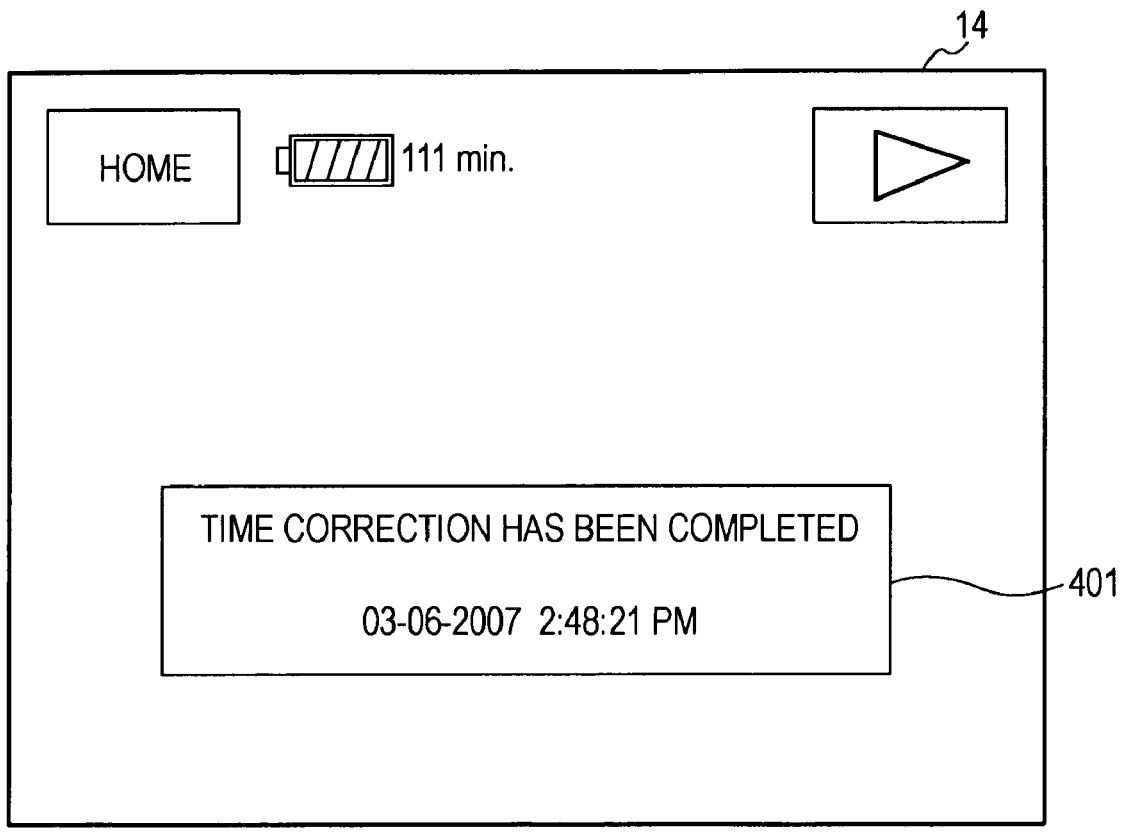
FIG. 7 is a diagram illustrating an example of an on-screen display for time correction on the display unit in the first embodiment of the present invention.

The display unit 14 includes a small liquid crystal display device or the like and is responsible for displaying various kinds of information on a screen. In addition, when the time measured by the timer part 19 is corrected, the display unit 14 displays this fact. An example of such a representation is illustrated in FIG. 7.

The RAM 15 includes a readable/writable storage device. When the control unit 11 performs processing, the RAM 15 can temporarily store data or the like.

The image pickup unit 16 generates image data (captured video) by conversion of incident light from a subject concentrated by a unit lens 23. The generated image data is then output to the image processing unit 18.

The HDD 17 is a hard disk in which various application programs and so on are stored. For example, the HDD 17 stores image data, which is output from the image processing unit 18, as video files.

The image processing unit 18 performs various image processing techniques on image data output from the image pickup unit 16 and the image data subjected to various image processing techniques is then output to the HDD 17.

The timer unit 19 is provided for measuring the time. For example, the timer part 19 measures the time being corrected with reference to the Greenwich Mean Time (GMT).

[Example of Functional Configuration of Image Pickup Apparatus]

FIG. 2 is a block diagram illustrating an example of the functional configuration of the image pickup apparatus 10 according to a first embodiment of the present invention.

From the viewpoint of functionality, the image pickup apparatus 10 includes a location information acquiring part 110, a latitude determining part 120, a peripheral location calculating part 130, a time-difference acquiring part 140, a time correction determining part 150, a time-correcting part 160, a storage part for information of time difference conversion 170, a retaining part for time difference history information 180, and a timer part 190.

The location information acquiring part 110 acquires location information and then outputs the information to the latitude determining part 120. Here, the location information includes information about latitude and longitude at a position where the location information acquiring part 110 acquired the location information. By the way, the location information acquiring part 110 corresponds to the GPS receiving unit 12 represented in FIG. 1.

The latitude determining part 120 makes a comparison between a predetermined value and the latitude value included in the location information output from the location information acquiring part 110 to determine whether the latitude value in the location information is higher than the predetermined value. If the latitude value included in the location information acquired by the position information acquiring part 110 is not higher than the predetermined value, then the latitude determining part 120 outputs the location information to the peripheral location calculating part 130. If the latitude value in the location information is higher than the predetermined value, then the latitude determining part 120 does not output the location information to the peripheral location calculating part 130. In other words, if the latitude value in the location information output from the location information acquiring part 110 is higher than the predetermined value, then a determination of whether the time correction determining part 150 should be allowed to correct the time is not performed. The term "predetermined value" used herein is a predetermined latitudinal value, such as a latitude of 85 degrees. For instance, at the place where the latitude is higher than a latitude of 85 degrees, a switching period of time difference at a position located at a latitude of larger than 85 degrees is shorter than that of 85 degrees in the longitudinal direction and thus the switching of time difference may be frequently performed. In addition, any user may have almost no opportunity to go off to the area at a latitude larger than 85 degrees. Therefore, the predetermined value is set to a latitude of 85 degrees to prevent a determination of whether the time correction determining part 150 should be allowed to correct the time from being carried out. The latitude determining part 120 may be designed to output the location information to the peripheral location calculating part 130 even if the latitude value included in the location information is the same as the predetermined value. The latitude determining part 120 corresponds to the control unit 11 represented in FIG. 1. In addition, the latitude determining part 120 is an example of the comparing part in the aforementioned embodiment of the present invention.

The peripheral location calculating part 130 calculates a location at a predetermined distance from a reference location which is specified by location information output from the latitude determining part 120. Subsequently, the peripheral location calculating part 130 outputs the calculated latitude and longitude values of each of the reference location and the peripheral location to the time-difference acquiring part 140. For example, there are four peripheral locations located 5 km forward of the reference location in the north, south, east, and west, respectively. Alternatively, there are two peripheral locations located 5 km forward of the reference location in the west and east directions, respectively. In this example, the peripheral location calculating part 130 corresponds to the control unit 11 represented in FIG. 1. Here, a method of calculating the peripheral locations by the peripheral location calculating part 130 will be described in detail with reference to FIG. 4.

The time-difference acquiring part 140 acquires each time difference corresponding to the latitude and longitude values of each of the reference location and peripheral location output from the peripheral location calculating part 130 using time-difference converting information stored in the storage part for information of time difference conversion 170. Subsequently, the time-difference acquiring part 140 outputs the acquired time difference of each of the reference location and the peripheral location to the time correction determining part 150. Here, the time-difference acquiring part 140 corresponds to the control unit 11 represented in FIG. 1.

The storage part for information of time difference conversion 170 stores information about time difference specified by the latitude and longitude as time-difference converting information, and the time-difference converting information memorized is supplied to the time-difference acquiring part 140. Here, the storage part for information of time difference conversion 170 corresponds to the ROM 13 represented in FIG. 1. The details of the time-difference converting information will be described using FIG. 3.

The retaining part for time difference history information 180 holds a time difference at the reference location when time correction is performed by the time-correcting part 160 as history information about time difference. This time difference history information is output to the time correction determining part 150 if necessary. Here, time difference history information currently held in the retaining part for time difference history information 180 is rewritten in response to an instruction from the correcting part 160 every time the time correction is performed by the time corresponding part 160. The retaining part for time difference history information 180 corresponds to the HDD 17 represented in FIG. 1. In addition, the retaining part for time difference history information 180 is an example of the time difference information retaining part in the aforementioned embodiment of the present invention.

The time correction determining part 150 acquires a time difference of each of the reference location and the peripheral location output from the time-difference acquiring part 140. Subsequently, depending on the time differences of these locations, the time correction determining part 150 determines whether the time correction should be performed. For example, the time correction determining part 150 employs the time-difference information history retained in the retaining part for time-difference history information 180 to determine whether any of the time differences of the reference location and the peripheral location corresponds to the time difference represented by the time difference history information. If any of the reference location and the peripheral location has the same time difference as one represented by the time difference history information, the time correction determining part 150 concludes that the time correction may not be performed.

On the other hand, the time correction determining part 150 concludes that the time correction should be performed if none of the reference location and the peripheral location has the same time difference as one represented by the time difference history information. Furthermore, if the time correction determining part 150 concludes that the time correction should be performed, then the time correction determining part 150 outputs time difference at the reference location to the time-correcting part 160.

For instance, the time correction determining part 150 can perform these judgments at the startup of the image pickup apparatus 10. Furthermore, the time correction determining part 150 performs these judgments on condition that a captured video is not generated by the image pickup unit 16. The time correction determining part 150 corresponds to the control unit 11 represented in FIG. 1. In addition, the time correction determining part 150 is an example of the determining part in the aforementioned embodiment of the present invention.

If the difference of the reference location from the time correction determining part 150, then the time-correcting part 160 outputs an instruction of correcting a time measured by time based on the time difference to the timer part 190. In addition, every time the time correction is instructed, the time-correcting part 160 outputs the time difference of the reference location to the retaining part for time difference history information 180. Then the time difference history information currently stored in the retaining part for time difference history information 180 is rewritten. The time-correcting part 160 corresponds to the control unit 11 represented in FIG. 1.

The timer part 190 is provided for measuring the time. If the time-correcting part 160 issues an instruction of correcting the time, then the time correction is performed on the basis of the instructed time difference. The timer part 190 corresponds to the timer unit 19 represented in FIG. 1.

[Example of Time-Difference Converting Information]

FIG. 3 is a diagram illustrating an example of time-difference converting information stored in storage part for information of time difference conversion 170 in first embodiment of a the present invention. The example shown in FIG. 3 schematically represents time-difference converting information that correlates with the latitude and longitude values of a location and the time differences corresponding to the latitude and longitude thereof.

Figure 3A:
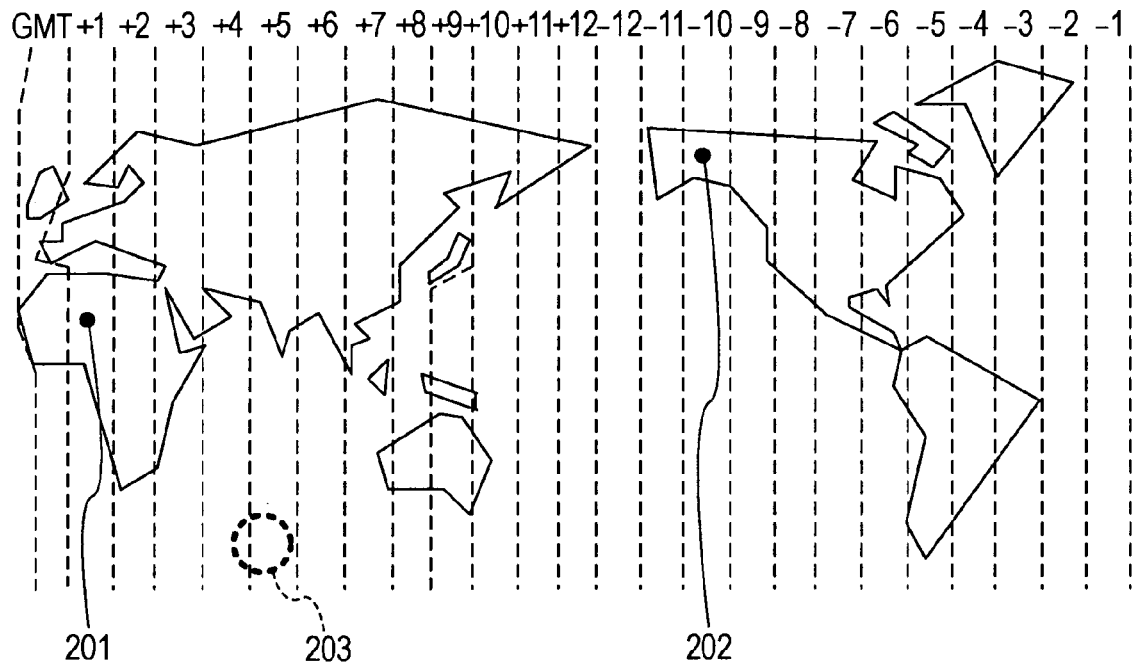
FIG. 3 is a diagram illustrating an example of time-difference converting information stored in storage part for information of time difference conversion in first embodiment of a the present invention.
Figure 3B:
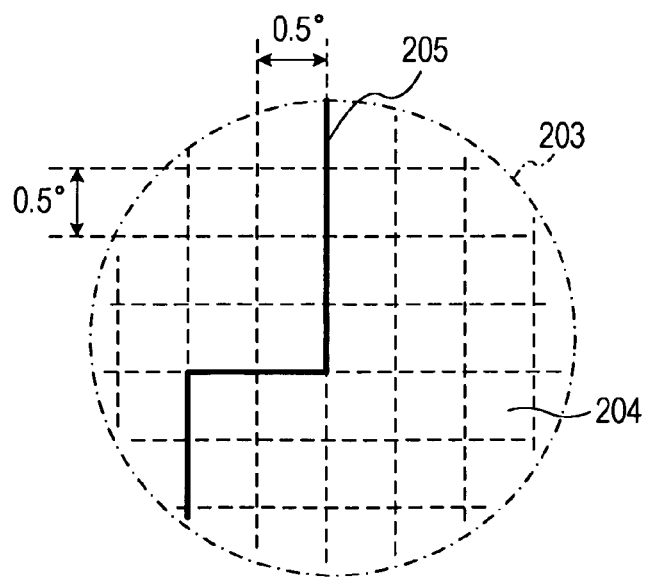

As shown in FIG. 3A, the time-difference converting information is a time-difference translation table that correlates with the latitude and longitude values of a location and the time differences corresponding to the latitude and longitude values thereof. The time difference corresponding to the location can be calculated using the latitude and longitude values of such a location. For example, a map drawn by the equidistant cylindrical projection is latitudinally divided into 360 sections and longitudinally divided into 720 sections. Therefore, the entire area of the map can be divided into a plurality of regions at a pitch of 0.5 degrees. FIG. 3B is an enlarged view of part of one divided region (e.g., a region surrounded by a circle 203). By correlating the respective regions divided as described above with the time differences between the time zones corresponding to these regions, the latitude and longitude values of any location and the time differences corresponding to the latitude and longitude thereof can be correlated. Therefore, the time difference on the basis of GMT can be correlated with the respective locations specified by the latitude and longitude values.

Among all regions shown in FIG. 3B, regions located on the east side from the boundary line 205 are correlated with the time difference of "GMT+5.0" and regions located on the west side from the boundary line 205 are correlated with a time difference of "GMT+4.0". Furthermore, for example, the region 204 shown in FIG. 3B is correlated with the time difference of "GMT+5.0". In contrast, for example, as shown in FIG. 3A, the time difference of "GMT+1" with respect to the location 201 can be obtained on the basis of the latitude and longitude levels corresponding to the location 201. Furthermore, the time difference of "GMT−10" with respect to the location 202 can be obtained on the basis of the latitude and longitude levels corresponding to the location 202. Therefore, the time difference corresponding the latitude and longitude can be obtained using the information of time difference conversion stored in the storage part for information of time difference conversion 170.

[Example of Calculation of Peripheral Location]

Figure 4:
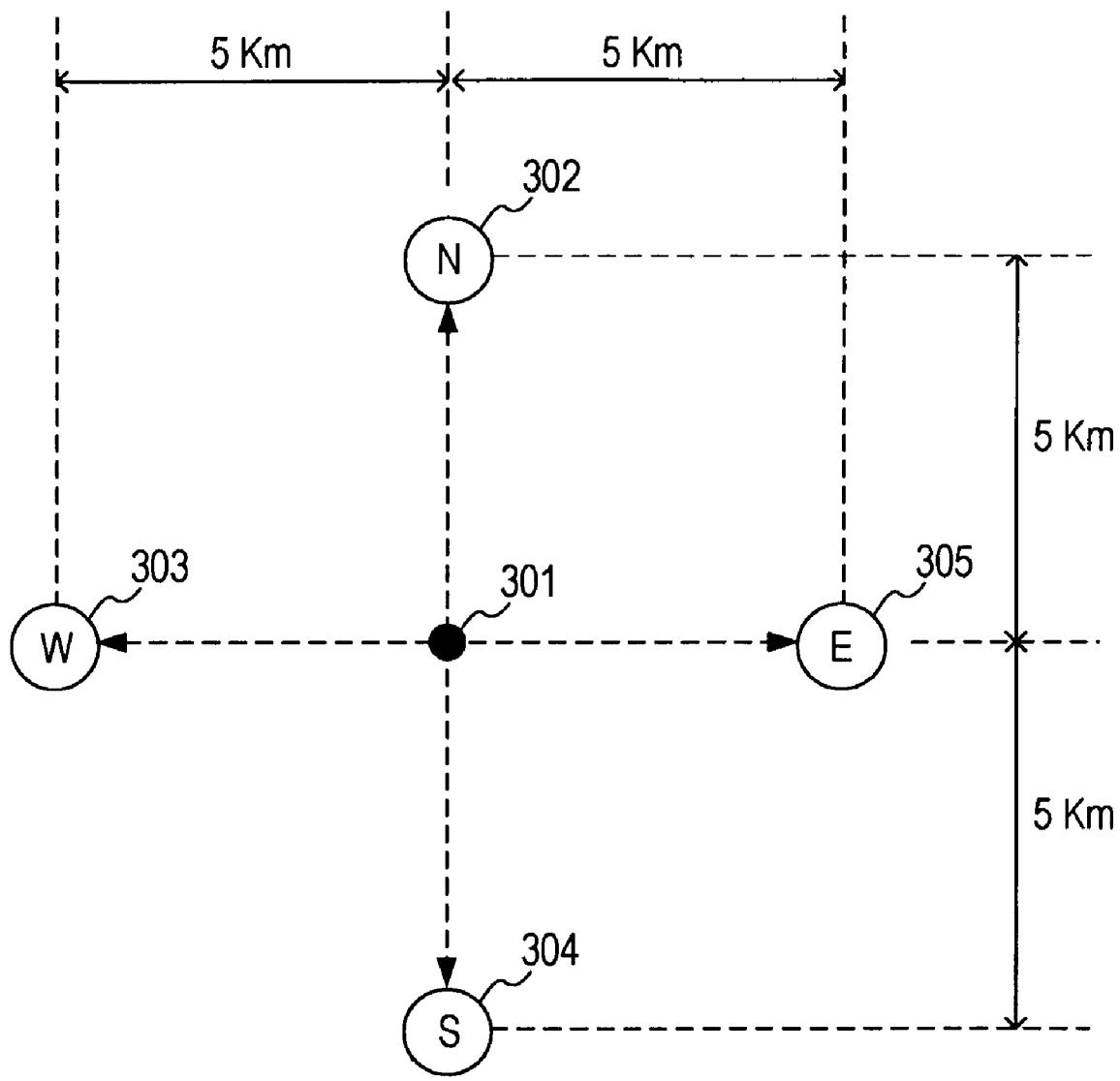
FIG. 4 is a diagram illustrating a method of calculating a peripheral location by the peripheral location calculating part according to the first embodiment of the present invention.

FIG. 4 is a diagram illustrating a method of calculating a peripheral location by the peripheral location calculating part 130 according to the first embodiment of the present invention. Here, the first embodiment of the present invention represents an example of calculating four peripheral locations as those 5 km away from the reference location in the north, south, east, and west directions, respectively. Here, the distance of 5 km is determined in consideration of an error (for example, 10 m to 1.5 km) of the GPS. In consideration of an error of the GPS, the necessity of correction with the user, and so on, for example, a given distance may be in the range of 3 km to 8 km. These values may be changed by the user's operation.

The reference location 301 shown in FIG. 4 is one specified by the location information acquired by the location information acquiring part 110. The peripheral location calculating part 130 calculates four peripheral locations 302 to 305 as those 5 km away from the reference location 301 in the north, south, east, and west, respectively. Specifically, the peripheral location calculating part 130 calculates the latitude and longitude values equivalent to each of the locations 5 km away from the latitude and longitude values of the reference location 301 in the north, south, east, and west, respectively, and a location corresponding to the calculated latitude and longitude values is then defined as a peripheral location. For instance, a location 5 km away from the reference location 301 in the north is defined as a peripheral location 302. A location 5 km away from the reference location 301 in the west is defined as a peripheral location 303. A location 5 km away from the reference location 301 in the south is defined as a peripheral location 304.

A location 5 km away from the reference location 301 in the east is defined as a peripheral location 305. Furthermore, in FIGS. 4 to 6, the peripheral locations are represented by open circles and their respective directions from the reference locations are represented by capital letters. Therefore, each peripheral location can be calculated by the peripheral location calculating part 130 using the corresponding latitude and longitude values included in the location information as described above.

[Example of Determination of Whether Time Correction Should be Performed]

FIG. 5 and FIG. 6 are diagrams illustrating a method of determining whether the time correction should be performed in the image pickup apparatus 10 according to the first embodiment of the present invention. In the example illustrated in FIG. 5 and FIG. 6, the image pickup apparatus 10 transferred from one region to another region, where each region corresponds to any of three different time zones: "GMT+9.0", "GMT+9.5", and "GMT+10.0". In FIG. 5 and FIG. 6, dashed lines represent the boundaries of these three time zones, respectively. Furthermore, the example illustrated in FIG. 5 and FIG. 6 is provided for describing the determination of whether the time correction should be performed every time the power supply of the image pickup apparatus 10 is turned on. In other words, this example is illustrated under the assumption that the power supply of the image pickup apparatus 10 is turned off after performing the time correction at the location 306 and then turned on after transferring the image pickup apparatus 10 to any of other locations 307 to 310. In this case, therefore, the retaining part for time difference history information 180 retains the time difference "GMT+9.0" at the location 306 as time difference history information. Furthermore, the latitude values of the respective locations 306 to 310 and the latitude values of the respective peripheral locations 311 to 326 are smaller than 85 degrees.

Figure 5A:
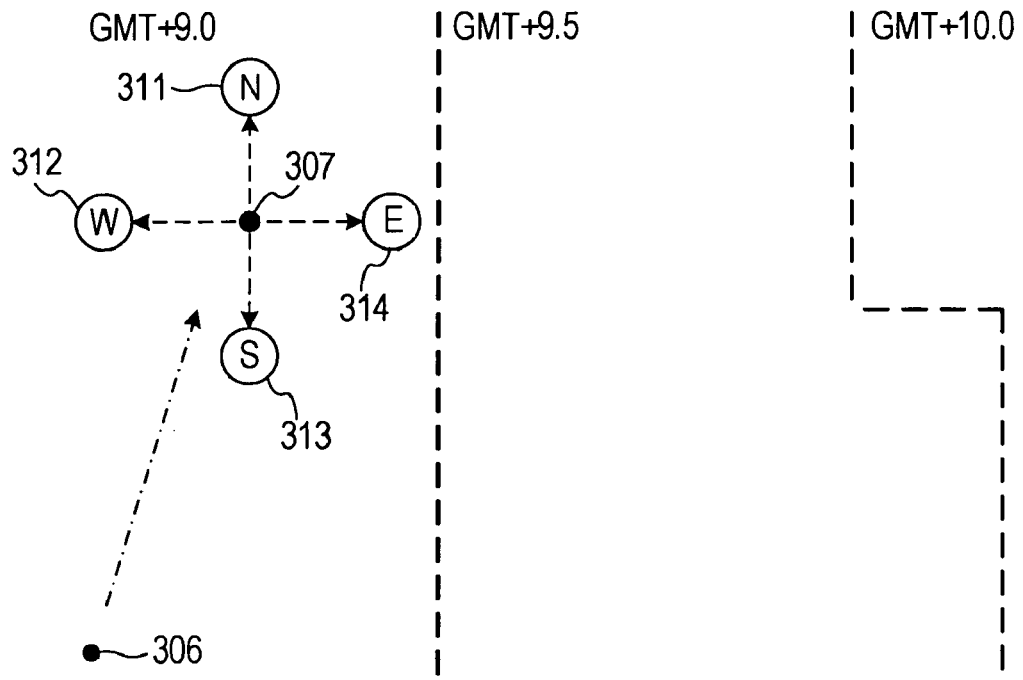
FIG. 5 is a diagram illustrating a method of determining whether the time correction should be performed in the image pickup apparatus according to the first embodiment of the present invention.

FIG. 5A illustrates that the image pickup apparatus 10 is transferred from the location 306 to the location 307.

Here, both the location 306 and the location 307 correspond to the time difference "GMT+9.0". If the image pickup apparatus 10 is transferred from the position 306 to the location 307, then the location information acquiring part 110 acquires location information. Subsequently, the latitude determining part 120 compares the latitude value included in the acquired location information with a predetermined latitude of 85 degrees. Here, since the acquired location information is one corresponding to the location 307, the latitude value included in the acquired location information is smaller than 85 degrees. Therefore, the location information is output to the peripheral location calculating part 130. The peripheral location calculating part 130 calculates the latitude and longitude values of the peripheral locations 311 to 314 by specifying the position 307 as a reference location. Subsequently, the peripheral location calculating part 130 outputs the latitude and longitude values of the location 307 and the peripheral locations 311 to 314 to the time-difference acquiring part 140. The time-difference acquiring part 140 acquires a time difference corresponding to the latitude and longitude values of each of the location 307 and the peripheral locations 311 to 314 based on time-difference converting information stored in the storage part for information of time difference conversion 170. For example, the time difference "GMT+9.0" is acquired for the peripheral locations 311 to 314. Next, time-difference acquiring part 140 outputs the time difference acquired for each of the location 307 and the peripheral locations 311 to 314 to the time correction determining part 150.

Time correction determining part 150 determines whether the time correction should be performed based on the time difference of each of the location 307 and the peripheral locations 311 to 314. In other words, the time correction determining part 150 determines whether the time difference "GMT+9.0" currently held in the retaining part for time difference history information 180 is included in the time differences of the location 307 and the peripheral locations 311 to 314. In this case, since the location 307 and the peripheral locations 311 to 314 have the same time difference "GMT+9.0", the time correction determining part 150 concludes that the time correction is not necessary.

Therefore, the time correction is not performed even if the image pickup apparatus 10 is transferred to the location 307.

Figure 5B:
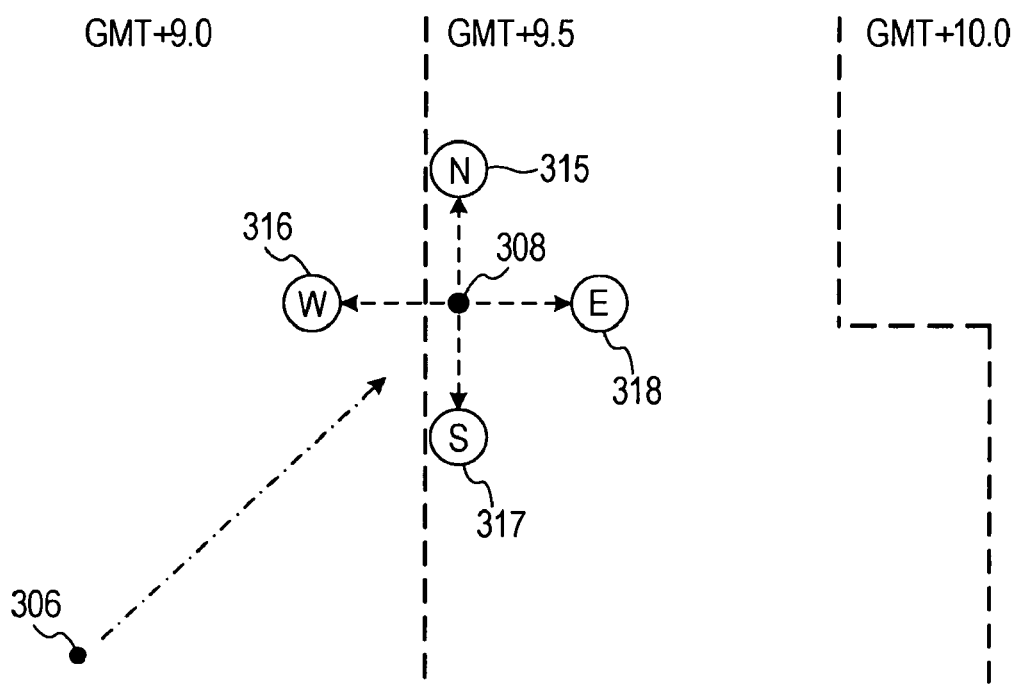

FIG. 5B illustrates that the image pickup apparatus 10 is transferred from the location 306 to the location 308.

Here, the location 306 corresponds to the time difference "GMT+9.0" and the location 308 corresponds to the time difference "GMT+9.5". If the image pickup apparatus 10 is transferred from the position 306 to the position 308, then the location information acquiring part 110 acquires location information. Subsequently, the latitude determining part 120 compares the latitude value included in the acquired location information with a predetermined latitude of 85 degrees. Here, since the acquired location information is one corresponding to the location 308, the latitude value included in the acquired location information is smaller than 85 degrees. Therefore, the location information is output to the peripheral location calculating part 130. The peripheral location calculating part 130 calculates the latitude and longitude values of the peripheral locations 315 to 318 by specifying the position 308 as a reference location. Subsequently, the peripheral location calculating part 130 outputs the latitude and longitude values of the location 308 and the peripheral locations 315 to 318 to the time-difference acquiring part 140. The time-difference acquiring part 140 acquires time differences corresponding to the latitude and longitude values of the location 308 and the peripheral locations 315 to 318 based on time-difference converting information stored in the storage part for information of time difference conversion 170, respectively. For example, the time difference "GMT+9.5" is acquired for the peripheral locations 315, 317, and 318. In addition, the time difference "GMT+9.0" is acquired for the peripheral location 316. Subsequently, the time-difference acquiring part 140 outputs the acquired time difference of each of the location 308 and the peripheral locations 315 to 318 to the time correction determining part 150. The time correction determining part 150 determines whether the time correction should be performed based on the time differences of each of the location 308 and the peripheral locations 315 to 318. In other words, the time correction determining part 150 determines whether the time difference "GMT+9.0" currently held in the retaining part for time difference history information 180 is included in the time differences of the location 308 and the peripheral locations 315 to 318. In this case, since the peripheral location 316 has the time difference "GMT+9.0", the time correction determining part 150 concludes that the time correction is not necessary. Therefore, the time correction is not performed even if the image pickup apparatus 10 is transferred to the location 308.

Figure 6A:
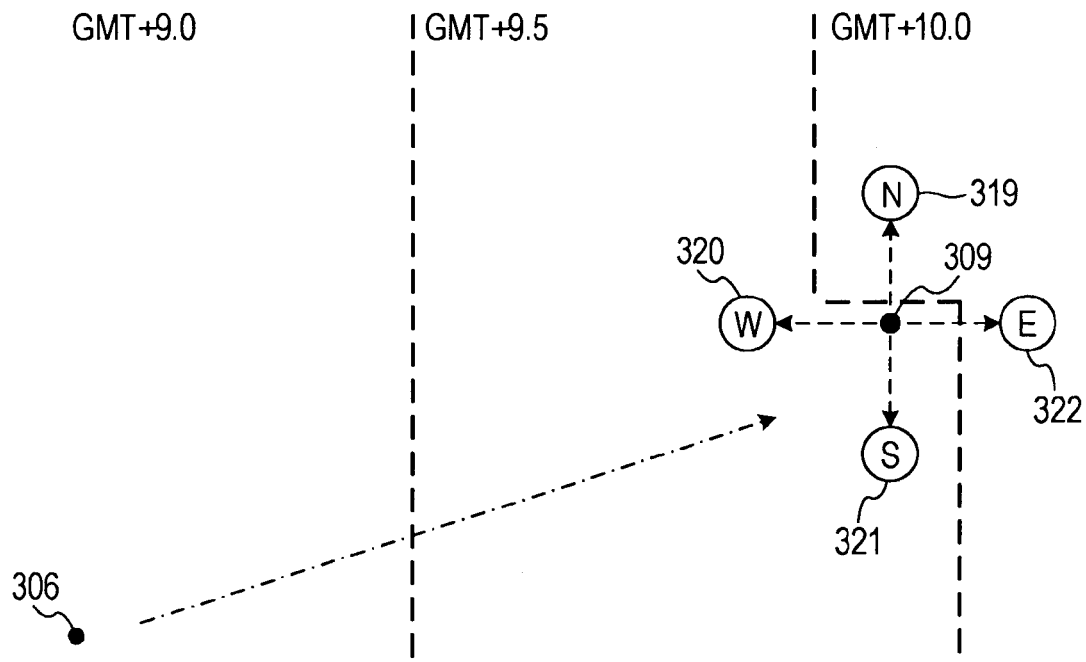
FIG. 6 is a diagram illustrating a method of determining whether the time correction should be performed in the image pickup apparatus according to the first embodiment of the present invention.

FIG. 6A illustrates that the image pickup apparatus 10 is transferred from the location 306 to the location 309.

Here, the location 306 corresponds to the time difference "GMT+9.0" and the location 309 corresponds to the time difference "GMT+9.5". If the image pickup apparatus 10 is transferred from the position 306 to the location 309, then the location information acquiring part 110 acquires location information. Subsequently, the latitude determining part 120 compares the latitude value included in the acquired location information with a predetermined latitude of 85 degrees. Here, since the acquired location information is one corresponding to the location 309, the latitude value included in the acquired location information is smaller than 85 degrees. Therefore, the location information is output to the peripheral location calculating part 130. The peripheral location calculating part 130 calculates the latitude and longitude values of the peripheral locations 319 to 322 by specifying the position 309 as a reference location. Subsequently, the peripheral location calculating part 130 outputs the latitude and longitude values of the location 309 and the peripheral locations 319 to 322 to the time-difference acquiring part 140. The time-difference acquiring part 140 acquires time differences corresponding to the latitude and longitude values of the location 309 and the peripheral locations 319 to 322 based on time-difference converting information stored in the storage part for information of time difference conversion 170, respectively. For example, the time difference "GMT+9.5" is acquired for the peripheral locations 320 and 321. In addition, the time difference "GMT+10.0" is acquired for the peripheral locations 319 and 322. Next, time-difference acquiring part 140 outputs the time difference acquired for each of the location 309 and the peripheral locations 319 to 322 to the time correction determining part 150. The time correction determining part 150 determines whether the time correction should be performed based on the time differences of each of the location 309 and the peripheral locations 319 to 322. In other words, the time correction determining part 150 determines whether the time difference "GMT+9.0" currently held in the retaining part for time difference history information 180 is included in the time differences of the location 309 and the peripheral locations 319 to 322. In this case, since the time difference of each of the location 309 and the peripheral locations 319 to 322 is not "GMT+9.0" the time correction determining part 150 concludes that the time correction should be performed. Like this example, if five locations have different time differences, for example they have either "GMT+9.5" or "GMT+10.0", the time correction is performed using a time difference corresponding to more locations, for example three locations.

In other words, if each of the location 309 and the peripheral locations 320 and 321 have the same time difference "GMT+9.5", then the time difference corresponding to more locations is "GMT+9.5". Thus, the time is corrected to the time difference "GMT+9.5".

Figure 6B:
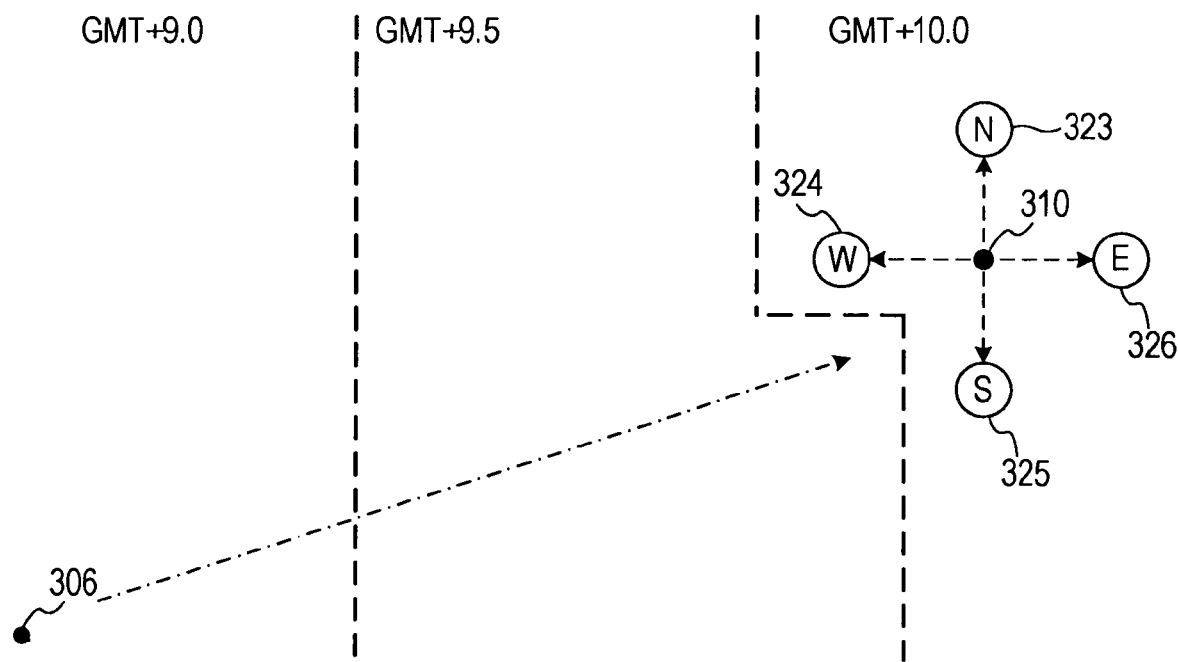

FIG. 6B illustrates that the image pickup apparatus 10 is transferred from the location 306 to the location 310.

Here, the location 306 corresponds to the time difference "GMT+9.0" and the location 310 corresponds to the time difference "GMT+10.0". If the image pickup apparatus 10 is transferred from the position 306 to the position 310, then the location information acquiring part 110 acquires location information. Subsequently, the latitude determining part 120 compares the latitude value included in the acquired location information with a predetermined latitude of 85 degrees. Here, since the acquired location information is one corresponding to the location 310, the latitude value included in the acquired location information is smaller than 85 degrees. Therefore, the location information is output to the peripheral location calculating part 130. The peripheral location calculating part 130 calculates the latitude and longitude values of the peripheral locations 323 to 326 by specifying the position 310 as a reference location. Subsequently, the peripheral location calculating part 130 outputs the latitude and longitude values of the location 310 and the peripheral locations 323 to 326 to the time-difference acquiring part 140. The time-difference acquiring part 140 acquires time differences corresponding to the latitude and longitude values of the location 310 and the peripheral locations 323 to 326 based on time-difference converting information stored in the storage part for information of time difference conversion 170, respectively. For example, the time difference "GMT+10.0" is acquired for the peripheral locations 323 to 326. Next, time-difference acquiring part 140 outputs the time difference acquired for each of the location 310 and the peripheral locations 323 to 326 to the time correction determining part 150. The time correction determining part 150 determines whether the time correction should be performed based on the time differences of each of the location 310 and the peripheral locations 323 to 326. In other words, the time correction determining part 150 determines whether the time difference "GMT+9.0" currently held in the retaining part for time difference history information 180 is included in the time differences of the location 310 and the peripheral locations 323 to 326. In this case, since the location 310 and the peripheral locations 322 to 326 have the same time difference "GMT+10.0", the time correction determining part 150 concludes that the time correction is necessary. Therefore, the time-correcting part 160 outputs an instruction of correcting the time based on the time difference "GMT+10.0" to the timer part 190.

[Example of Display Notifying Time Correction]

FIG. 7 is a diagram illustrating an example of an on-screen display for time correction on the display unit 14 in the first embodiment of the present invention. As shown in FIG. 7, a corrected time is displayed on the screen of the display unit 14 to notify the user that the time correction has been completed. For instance, every time the time correction is performed by the time-correcting part 160, the display unit 14 automatically displays an on-screen display 401 that notifies the user about the completion of time correction in response to an instruction from the time-correcting part 160. For example, the on-screen display 401 for the completion of time correction displays a text that notifies the user about the completion of time correction and a time measured by time. The time measured by time after the time correction is updated on the second time scale. Furthermore, the on-screen display 401 for the completion of time correction may be automatically disappeared after five seconds from the start of display or may be disappeared in response to "clear" operation by the user. Furthermore, in the first embodiment of the present invention, the above example is of using the display to notify the user that the time correction has been performed. Alternatively, for example, the user may be notified by an audio output.

[Operation Example of Image Pickup Apparatus]

Next, an operation example of the image pickup apparatus 10 according to the first embodiment of the present invention will be described.

Figure 8:
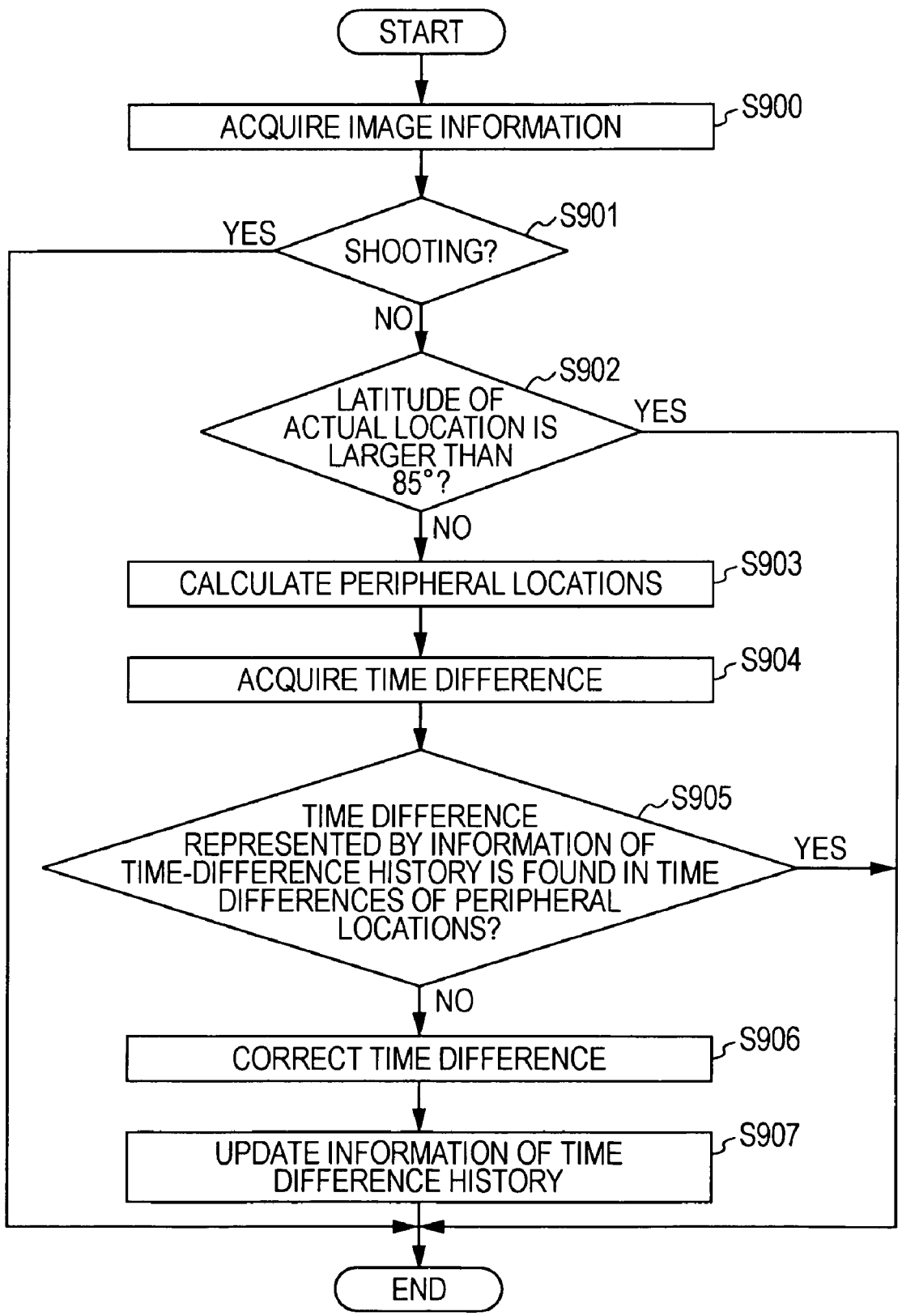
FIG. 8 is a flow chart illustrating the procedures of time-correction processing performed by the image pickup apparatus according to the first embodiment of the present invention.

FIG. 8 is a flow chart illustrating the procedures of time-correction processing performed by the image pickup apparatus 10 according to the first embodiment of the present invention.

First, location information is acquired by the location information acquiring part (Step S900). The step S900 is an example of the procedures of acquiring location information, which can be applied to the embodiment of the present invention. Next, it is determined whether a captured video is generated by the image pickup unit 16 (Step S901).

If the captured video is generated ("YES" in Step S901), then the operation of the time-correction processing is ended. On the other hand, if the captured video is not generated ("NO" in Step S901), then the latitude determining part 120 compares a latitude value included in the location information with a predetermined latitude of 85 degrees to determine the deference between them (Step S902). If the latitude value in the location information is larger than the predetermined latitude of 85 degrees ("YES" in Step S902), then the operation of the time-correction processing is ended. On the other hand, if the latitude value in the location information is equal or lower than a predetermined latitude of 85 degrees ("NO" in Step S902), then the location information is output to the peripheral location calculating part 130.

Next, the peripheral location calculating part 130 calculates a location at a predetermined distance from a reference location which is specified by location information output from the latitude determining part 120 (Step S903). Here, the step S903 is an example of the procedures of calculating the peripheral location in accordance with the embodiment of the present invention. Next, the time-difference acquiring part 140 acquires a time difference of each of the reference location and peripheral location calculated by the peripheral location calculating part 130 using time-difference converting information stored in the storage part for information of time difference conversion 170 (Step S904). Here, the step S904 is an example of the procedures of calculating the peripheral location in accordance with the embodiment of the present invention.

Next, the time correction determining part 150 determines whether the time difference represented by the time difference history information currently held in the retaining part for time difference history information 180 is included in the time differences of the reference location and the peripheral locations (Step S905). Here, the step S905 is an example of the procedures of determination in accordance with the embodiment of the present invention. If there is the same time difference as one represented by the time difference history information ("YES" in Step S905), then the operation of time-correction processing is ended. On the other hand, if there is no time difference identical to one represented by the time difference history information ("NO" in Step S905), then the time-correcting part 160 outputs an instruction of correcting a time measured by time based on the time difference corresponding to the reference location to the timer part 190 and the timer part 190 corrects the time measured by time based on this time difference (Step S906). Here, the step S906 is an example of the procedures of time correction in accordance with the embodiment of the present invention. In addition, the time-correcting part 160 outputs the time difference information corresponding to the reference location to the retaining part for time difference history information 180. Subsequently, the retaining part for time difference history information 180 retains such a time difference as time difference history information (Step S907) and the operation of time-correction processing is then ended.

As described above, in the first embodiment of the present invention, a time difference is corrected in consideration of a location where the image pickup apparatus 10 is present and the peripheral locations thereof. Therefore, for example, a time measured by time is prevented from being frequently corrected on the basis of a time difference even if the image pickup apparatus 10 is located near the boundary of time zones. Therefore, for example, a time measured by time related to a video can be prevented from being frequently changed during the video recording. Furthermore, any error may occur in GPS signals or the like. For example, any error may occur in electric waves received by the image pickup apparatus 10 when many high buildings are present around the image pickup apparatus 10, or the image pickup apparatus 10 is surrounded by high buildings. Furthermore, for example, when electric waves transmitted from a GPS satellite are transmitted through the atmosphere while being affected by clouds, moistures, and so on, the electric waves received by the image pickup apparatus 10 may include an error. According to the first embodiment of the present invention, a time measured by time can be corrected at an appropriate time even in such a case because a time difference is corrected in consideration of the location of the image pickup apparatus 10 and the peripheral locations thereof.

2. Modified Example

Next, a modified example of the first embodiment of the present invention will be described.

The image pickup apparatus 10 as a modified example of the first embodiment of the present invention is provided with a wireless LAN (Local Area Network) transmission/reception unit instead of the GPS receiving unit 12 of the first embodiment.

The wireless LAN transmission/reception unit is connected to an access point and transmits and receives data with a wireless communication system. In addition, the wireless LAN transmission/reception unit acquires location information using access point information of the surrounding wireless LAN and then outputs the acquired location information to the control unit 11.

As described above, according to the modified example of the first embodiment of the present invention, location information can be also acquired from an access point of the wireless LAN. Therefore, for example, a time correction can be performed even in the underground where any GPS signal can be hardly received from a GPS satellite.

As described above, in the present embodiment, in an exemplified method of calculating a peripheral location by the peripheral location calculating part 130, four different locations 5 km away from a reference location in the north, south, east, and west are calculated as peripheral locations. Alternatively, this method of calculating peripheral locations by the peripheral location calculating part 130 may calculate two locations at a predetermined distance from the reference location in the west and east as peripheral locations. Then, a time correction may be performed using such two peripheral locations.

The embodiment of the present invention has been described as an image pickup apparatus. Alternatively, the embodiment of the present invention may be applied to any of other electronic apparatuses including a timer part provided for measuring a time and a location information acquiring part provided for acquiring location information. Alternatively, in addition to the method of acquiring location information using GPS signals or by wireless LAN, location information may be acquired by another method of acquiring location information.

Furthermore, the embodiment of the present invention has been described as an example of embodying the present invention and the structural and functional components thereof are in correspondence with particular matters of the invention as set forth in the appended claims. However, the present invention is not limited to any of embodiments and various modifications can be performed as long as it does not depart from the gist of the present invention.

The processing procedures described in the embodiment of the present invention may be regarded as a method having a sequence of the procedures and also regarded as a program for executing such a sequence of the procedures and as a recording medium that stores such a program. The recording medium may be, for example, any of compact discs (CDs), mini discs (MDs), digital versatile discs (DVDs), memory cards, and Blu-ray Disc (registered trademark).

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
a timer part that measures a time;
a location information acquiring part that acquires location information;
a peripheral location calculating part where a location specified by said acquired location information is provided as a reference location and a location at a predetermined distance from said reference location is calculated as a peripheral location;
a time-difference acquiring part that acquires time differences depending on said reference location and said peripheral location;
a determining part that determines whether said time correction should be performed based on said time differences depending on said reference location and said peripheral location; and
a time-correcting part that corrects said time to a time based on said time differences depending on said reference location and said peripheral location depending on a result from said determination by said determining part.

2. The electronic apparatus according to claim 1, further comprising:
a time difference information retaining part that retains said time difference acquired for said reference location when said time correction is performed by said time-correcting part, wherein
said determining part determines that said time correction is not necessary when a time difference retained in said time difference information retaining part is included in time differences acquired for said reference location and said peripheral location.

3. The electronic apparatus according to claim 2, wherein said time difference retained in said time difference information retaining part is rewritten every time said time is corrected by said time-correcting part.

4. The electronic apparatus according to claim 1, further comprising:
a storage part for information of time difference conversion where latitude and longitude values and time differences corresponding to said latitude and longitude values are stored in relationship to one another, wherein
said time-difference acquiring part acquires a time difference stored in said storage part for information of time difference conversion in association with said latitude and longitude values included in said acquired location information as a time difference depending on said reference location, and
said time difference stored in said storage part for information of time difference conversion in association with the latitude and longitude values corresponding to said peripheral location as a time difference depending on said peripheral location.

5. The electronic apparatus according to claim 1, further comprising:
a comparing part making a comparison between said latitude value in said location information and said predetermined value, wherein
said determining part determines that said time correction is not performed when said latitude value in said acquired location information is larger than said predetermined value provided as a reference as a result of said comparison performed by said comparing part.

6. The electronic apparatus according to claim 1, wherein said determining part determines whether said time correction should be performed at the time of activating said electronic apparatus.

7. The electronic apparatus according to claim 1, further comprising:
a display part displaying a fact that said time correction is performed by said time-correcting part when said time correction is performed by said time-correcting part.

8. The electronic apparatus according to claim 1, wherein said peripheral location calculating part calculates four locations located at said predetermined distance from said reference location in the north, south, east, and west as said peripheral locations.

9. The electronic apparatus according to claim 1, wherein said peripheral location calculating part calculates two locations located at said predetermined distance from said reference location in the east and west as said peripheral locations.

10. An imaging apparatus, comprising:
an image pickup unit shooting a photographic subject to generate a captured video;
a timer part measuring a time;
a location information acquiring part that acquires location information;
a peripheral location calculating part where a location specified by said acquired location information is provided as a reference location and a location at a predetermined distance from said reference location is calculated as a peripheral location;
a time-difference acquiring part that acquires time differences depending on said reference location and said peripheral location;
a determining part that determines whether said time correction should be performed based on said time difference depending on said reference location and said peripheral location on the condition that said image pickup part does not generate a captured video; and
a time-correcting part that corrects said time to a time based on said time differences depending on said reference location and said peripheral location depending on a result from said determination by said determining part.

11. A time-correcting method comprising steps of:
acquiring location information;
calculating as a peripheral location a location located at a predetermined distance of a reference location provided as a location specified by said acquired location information;
acquiring time differences depending on said reference location and said peripheral location;
determining whether a time measured by a timer part should be corrected based on time differences of said reference location and said peripheral location; and
correcting said time to a time based on a time difference of said reference location depending on a result of determination by said determination procedures.

12. A non-transitory computer readable recording medium having stored thereon a program allowing a computer to execute procedures, wherein said procedures include:
location-information acquiring procedures to acquire location information;
peripheral location calculating procedures to calculate a location located at a predetermined distance of a reference location provided as a location specified by said acquired location information as a peripheral location;
time difference acquiring procedures to acquire time differences depending on said reference location and said peripheral location;
determining procedures to determine whether a time measured by a timer part should be corrected based on time differences of said reference location and said peripheral location; and
time-correction procedures to correct said time to a time based on a time difference of said reference location depending on a result of determination by said determination procedures.

* * * * *